United States Patent [19]

Daniels

[11] 3,762,919

[45] Oct. 2, 1973

[54] TITANIUM CARBIDE-NICKEL COMPOSITION PROCESS

[75] Inventor: Alma U. Daniels, Wilmington, Del.

[73] Assignee: E. I. du Pont de Nemours and Company, Wilmington, Del.

[22] Filed: Feb. 28, 1972

[21] Appl. No.: 230,070

Related U.S. Application Data

[62] Division of Ser. No. 828,699, May 28, 1969, Pat. No. 3,674,443.

[52] U.S. Cl. ........................ 75/204, 75/213, 75/221, 75/225, 75/226

[51] Int. Cl. .............................................. B22f 3/16

[58] Field of Search ..................... 75/204, 213, 221, 75/225, 226

[56] References Cited

UNITED STATES PATENTS

| | | | |
|---|---|---|---|
| 3,451,791 | 6/1969 | Meadows | 75/204 X |
| 3,455,682 | 7/1969 | Barbas | 75/204 |
| 3,490,901 | 1/1970 | Hachisuka | 75/213 X |

*Primary Examiner*—Leland A. Sebastian
*Attorney*—Gerald A. Hapka

[57] ABSTRACT

Dense, homogeneous compositions having (a) a density in excess of 95 percent of theoretical and (b) an average grain size less than 10 microns and consisting of:

1. 80–97 percent by volume of titanium carbide and
2. 3–20 percent by volume of nickel, the nickel being present mainly as a binder phase uniformly distributed at the grain boundaries, are useful as cutting edges for cutting tools.

4 Claims, No Drawings

0
TITANIUM CARBIDE-NICKEL COMPOSITION PROCESS

This is a division of application Ser. No. 828,699 filed May 28, 1969, now U.S. Pat. No. 3,674,443.

BACKGROUND

In the past, many attempts have been made to make strong dense compositions which have small average grain sizes by sintering titanium carbide and nickel compositions. Such titanium carbide-nickel bodies have very large average grain sizes and the nickel has not been uniformly distributed, possibly due to inadequate wetting of the titanium carbide by the nickel, and furthermore the bodies have been lacking in strength. To overcome this problem, it has been the practice to use molybdenum along with the nickel. See Swinehart, *Cutting Tool Materials Selection A.S.T.M.E.*, Dearborn, page 89 (1963). The use of molybdenum along with the nickel gives improved wetting of the carbide phase and enables a strong sintered composition to be made.

It has now been discovered that strong, dense titanium carbide-nickel bodies can be prepared in the absence of molybdenum when the process as taught in the instant invention is employed.

SUMMARY OF THE INVENTION

It has been found that dense titanium carbide-nickel bodies with average grain sizes smaller than 10 microns can be prepared when particular process conditions are used.

Thus, the invention relates to the following compositions of matter: homogeneous compositions having (a) a density in excess of 95 percent of theoretical and (b) an average grain size less than 10 microns consisting of:

1. 80–97 percent by volume of titanium carbide and
2. 3–20 percent by volume of nickel, the nickel being present mainly as a binder phase uniformly distributed at the grain boundaries, substantially all of said binder phase having a thickness of less than 0.5 micron.

These compositions demonstrate exceptional advantages over sintered titanium carbide-nickel compositions and as a result of their exceptional properties the compositions of this invention are useful as cutting tools in machining materials such as cast iron and alloy steel.

The above compositions can be made by:

I. intimately milling together a mixture of fine titanium carbide and nickel powder in a hydrocarbon oil and separating, drying and screening the powder in a non-oxidizing atmosphere;

II. charging in a non-oxidizing atmosphere the titanium carbide-nickel powder to a grpahite mold provided with close fitting graphite pistons and in either sequence (a) applying to the powder by means of said pistons a pressure of 0–500 psi and (b) introducing the mold into a vacuum furnace preheated to a temperature in the range of from 1,000°C. to 1,475°C.;

III. heating said mixture under vacuum to a selected temperature in the range of from 1,350°C. to 1,475°C. in a period of time ranging from about 2 minutes to 20 minutes while maintaining a pressure of from 0–500 psi;

IV. maintaining the final temperature and pressure of Step III for a period of time ranging from zero minutes to 5 minutes;

V. maintaining the temperature of Step III and applying to the sample by means of the graphite pistons a pressure in the range of from 500 psi to 4,000 psi for a period of time ranging from 2 minutes to 6 minutes; and VI. thereafter immediately releasing the pressure on the pistons, removing the die from the furnace and rapidly cooling the resulting titanium carbide-nickel composition.

DETAILED DESCRIPTION

Starting Materials

Titanium carbide is used in the compositions of this invention in amounts ranging from 80–97 percent by volume. At least 80 volume percent titanium carbide is required to provide adequate hardness. Preferred amounts of carbide range from 85–95 percent by volume to achieve an optimum balance of strength and hardness.

Titanium carbide can be obtained commercially or can be synthesized by methods well known to the art. The titanium carbide should be finely divided, that is it should have a particle size of less than 5 microns and preferably less than 2 microns. If the starting material is appreciably larger than 5 microns in particle size it can be pre-ground to reduce its size to that which is acceptable. Of course the milling of the components of this invention, which is carried out to obtain a high degree of homogeneity, will result in some comminution of the carbide and the other starting component, nickel.

NIckel is used in the compositions of this invention in amounts ranging from 3–20 percent by volume. At least 3 volume percent of nickel is required to provide adequate strength. The preferred amounts of nickel are 5–15 percent by volume since an optimum balance of strength and hardness are achieved in this range.

The starting materials used in the compositions of this invention should be pure. In particular it is desired to exclude impurities such as oxygen which tends to have deleterious effects on the dense compositions. On the other hand minor amounts of many impurities can be tolerated with no appreciable loss of properties. Thus, the metal can contain small amounts of other metals such as titanium, zirconium, tantalum or niobium as minor impurities, although low melting metals like lead should be excluded. Small amounts of carbides other than titanium carbide, such as several percent of tungsten carbide, which is sometimes picked up in grinding, can be present. Even oxygen can be tolerated in small amounts such as occurs when titanium carbide has been exposed to air resulting in a few percent of titanium oxy-carbide. However, after the powder components have been milled together and are in a highly reactive state, oxidation, particularly of the metals, occurs easily and should be avoided.

PROCESS OF MANUFACTURE

The manner in which the compositions of this invention are prepared is important, because the characteristics of the compositions are achieved in part at least as a result of the manner in which they are prepared. Thus the use of fine-grained starting materials and thorough milling of the mixed components are directly related to the fine grain size and uniform homogeneity of the compositions. Other precautions which should be observed in preparing the compositions which have important effects on the products are:

1. the prevention of excessive contamination from grinding media and moisture or oxygen in the air;
2. hot-pressing or presintering under conditions which permit the escape of volatile materials prior to densification;
3. avoiding undue absorption of carbon from pressing molds by limiting their contact under absorption-promoting conditions;
4. avoiding excessive component recrystallization and resultant segregation by avoiding prolonged subjection to very high temperatures.

1. Milling and Powder Recovery

Milling of the components, to homogeneously intermix them and obtain very fine grain sizes, is carried out according to the practices common in the art. If roller milling is employed, optimum milling conditions will ordinarily involve a mill half-filled with a grinding medium such as cobalt bonded tungsten carbide or alumina balls or rods, a liquid medium such as a hydrocarbon oil, an inert atmosphere, grinding periods of from a few days to several weeks, and powder recovery also in an inert atmosphere. The recovered powder is ordinarily dried at temperatures of around 150°–300°C. under vacuum, followed by screening and storage when desirable in an inert atmosphere. Other methods of milling, such as vibratory milling can also be used in preparing the powders.

2. Consolidation

The compositions of this invention are ordinarily consolidated to dense, pore-free bodies by sintering under pressure. Consolidation is ordinarily carried out by hot pressing the mixed powders in a graphite mold under vacuum.

The hot pressing process consists of loading milled and dried powder into a graphite mold or die provided with close fitting graphite pistons and subjecting it to a pressure of 0–500 psi, applied to the pistons by means of hydraulically activated rams, inserting the mold into the heated zone (1,000°C.-1,475°C.) of a vacuum hot press, thus allowing volatile impurities to escape before the composition is densified. Full pressure (500–4,000 psi) is then applied to the sample at or near maximum temperature (1,350°–1,475°C.) employed for a period of time ranging from 2 minutes to 6 minutes.

The pressure is then released and the mold containing the densified body is immediately ejected from the heated zone of the hot press and cooled rapidly in the course of a few minutes to dull red heat while still under vacuum.

Maximum or goal temperatures for hot pressing range between 1,350°C. and 1,475°C. depending on the amount of nickel which is present. The temperatures will ordinarily be about 1,400°C. Full pressures used during hot pressing ordinarily range between 500 and 4,000 psi, with low pressures being used in combination with lower temperatures for compositions with a high nickel content. Conversely, higher pressures and temperatures are employed for compositions low in nickel.

As would be expected, at higher temperatures and pressures, some of the nickel may tend to squeeze out of the compositions when pressure is applied. This tendency can be compensated for by starting with a little more nickel than is desired in the final body when operating at a high temperature and pressure. By this procedure, some of the nickel will be squeezed out during pressing, leaving the body with the desired metal content. Generally speaking, appreciable squeeze-out of metal is to be avoided not only because it changes the composition but also because the metal causes sticking to and damaging of the molds.

It is important that during hot pressing, the compositions not be heated to a goal temperature for a period of time which is much in excess of that required to eliminate porosity and achieve density. Such higher temperatures or longer times can result in excessive grain growth, coarsening of the structure, the development of secondary porosity due to recrystallization, or in the formation of undesirable phases.

The products of this invention are ordinarily subjected to pressure at maximum temperature for 2–6 minutes after which the product is immediately removed from the hot zone. The resultant bodies are fine grained, homogeneous, essentially pore-free, and are characterized by high hardness and excellent transverse rupture strength.

Characteristics of the Compositions

In addition to characterizing the compositions of this invention on the basis of the components discussed above, the compositions can also be characterized on the basis of their structural characteristics, i.e., fine grain size and homogeneity.

The dense bodies of this invention are characterized as having a fine average grain size smaller than 10 microns and preferably smaller than 5 microns in average grain diameter. Moreover, the grain size is uniform throughout the compositions and there is essentially no porosity in the dense compositions of this invention. The fine grain size and low porosity of dense compositions of this invention contribute greatly to its hardness and thus result in bodies which are exceptionally abrasion-resistant. For example, cutting tools made from dense bodies of this invention resist abrasion when coming in contact with the hard carbide inclusions that are found in cast iron.

Distribution of the titanium carbide and nickel in dense bodies of this invention is uniform and homogeneous, and, generally speaking, any area 100 microns square which is examined microscopically at 1,000X magnification will appear the same as any other area 100 microns square within conventional statistical distribution limits. The nickel is present mainly as a binder phase uniformly distributed at the grain boundaries, substantially all of said binder having a thickness of less than 0.5 microns, in contrast to compositons prepared by conventional sintering where the nickel is largely present as heterogeneously distributed inclusions in a coarse-grained weak body. The combination of fine grain size and homogeneity of distribution of the components in dense bodies of this invention results in bodies which are resistant to thermal shock both as regards shattering and as regards surface heat-cracking.

The products may contain small amounts of iron, cobalt, tungsten carbide, alumina, and other impurities, which are generally picked up during the milling process. When metallic impurities are present, they will generally consititue less than about 1 percent by volume of the total composition. When alumina inserts are used during milling, for example in a vibratory mill, there may be as much as 5 percent by volume of alumina present.

The products of this invention will have actual densities in excess of 95 percent of theoretical, preferably in excess of 98 percent of theoretical. Theoretical density for any given composition is determined by the following equation:

$$\rho t = 4.95 \ V_{TiC} + 8.90 \ V_{Ni}$$

wherein $\rho t$ = theoretical density in grams per cubic centimeter;

$V_{TiC}$ = desired volume in cubic centimeters of titanium carbide per cubic centimeter of product;

$V_{Ni}$ = desired volume in cubic centimeters of nickel per cubic centimeter of product.

A comparison of actual density to theoretical density is of course an indication of the degree of porosity.

EXAMPLES

The invention will be better understood in reference to the following examples wherein parts are by weight unless otherwise noted.

EXAMPLE 1

This is an example of a composition containing 93 volume percent titanium carbide and 7 volume percent nickel.

The titanium carbide used is a fine powder with a specific surface area of 3 m²/g., as determined by nitrogen adsorption. An electron micrographs shows that the titanium carbide grains are approximately 2 microns in diameter, and are clustered in the form of loose aggregates. The carbon content is 19.0 percent and the oxygen analysis indicates a titanium dioxide content of about 2.5 percent.

The nickel used is a fine powder containing 0.15 percent carbon, 0.07 percent oxygen, and less than 300 parts per million iron. The specific surface area of the nickel powder is 0.48 m²/g. and its X-ray diffraction pattern shows only nickel which has a crystallite size of 150 millimicrons as calculated from line broadening. Under the electron microscope, the powder appears as polycrystalline grains, 1 to 5 microns in diameter.

The powders are milled by loading 8,300 grams of cyclindrical 6 percent cobalt-bonded tungsten carbide inserts, one-fourth inch long and one-fourth inch in diameter in a 1.8 liter steel rolling mill that is completely lined with 6 percent cobalt-bonded tungsten carbide. The inserts have been previously "worn in" so that contamination of powder batches with tungsten carbide-cobalt will be kept to a few percent. The mill is charged with a mixture of 500 ml. of "Soltrol" 130 (a saturated paraffinic hydrocarbon with a boiling point of approximately 130°C.), 230 grams of the titanium carbide and 31.2 grams of the nickel as above described.

The mill is then sealed and rotated at 90 rpm for 5 days. The mill is then opened and the contents emptied while keeping the milling inserts inside. The mill is then rinsed out with "Soltrol" 130 several times until essentially all of the milled solids are removed.

The milled powder and liquid are then transferred to a vacuum evaporator and the excess hydrocarbon is decanted off after the suspended material has settled. The wet residual cake is then dried under vacuum with the application of heat until the temperature within the evaporator is between 200° and 300°C., and the pressure is less than about 0.1 mls. of mercury. Thereafter, the powder is handled entirely in the absence of air.

The dry powder is passed through a 70 mesh screen in a nitrogen atmosphere, and then stored under nitrogen and sealed in plastic containers.

A consolidated billet is prepared from this powder by hot pressing the powder in a cylindrical graphite mold having a cylindrical cavity 1 inch in diameter and which is equipped with opposing close-fitting graphite pistons. One piston is held in place in one end of the mold cavity, while 22 grams of the powder is dropped into the cavity under nitrogen and evenly distributed by rotating the mold and tapping it lightly on the side. The upper piston is then put in place under hand pressure. The assembled mold and contents are then placed in the vacuum chamber of a vacuum hot press. The mold is held in a vertical position and the pistons extending above and below are engaged between opposite graphite grams of the press under pressure of about 100 psi. Within a period of a minute, the mold is raised into the hot zone of the furnace at 1,000°C., and at once the temperature of the furnace is increased while the pressure is maintained at 100 psi during the heat-up period. The temperature is raised from 1,000°C. to 1,400°C. in about 4 minutes, and the temperature of the mold is then held at 1,400°C. for another 2 minutes to ensure uniform heating of the sample. A pressure of 4,000 psi is applied to the billet through the pistons for 4 minutes. The pressure is then released and the mold and contents are immediately moved out of the furnace into a cool zone and cooled to dull red heat in about 5 minutes.

After further cooling, the mold and contents are removed from the vacuum furnace and the billet is removed from the mold and sand-blasted to remove any adhering carbon.

The hot pressed billet is found to be essentially nonporous, having no visible porosity under 1,000X magnification. An electron micrograph at 20,000X magnification on a sample etched with a mixture of hydrofluoric, nitric and sulfuric acids shows a homogeneous composition having an average grain size of about one micron, with a nickel-rich binder phase uniformly distributed at the grain boundaries and having a thickness of 0.05 to 0.3 microns. Few of the grains exceed 2 or 3 microns in size. The density is 99 percent of the theoretical density.

X-ray diffraction analysis reveals primarily a sharp, strong face-centered cubic type pattern with atomic spacing of 4.323 Angstroms indicating titanium carbide, and also diffraction lines showing the presence of free nickel.

Chemical analysis shown, in addition to titanium, carbon and nickel, the presence of about 2.7 percent of tungsten and 0.15 percent of cobalt. The tungsten and cobalt are presumably picked up from attrition of the milling inserts and mill lining. The billet, which is 1 inch in diameter, and about 0.30 inch in thickness, is cut so that a piece slightly larger than one-half inch square is removed from the center. Strips 0.070 inch in thickness are cut from the material remaining to each side of the center piece, and are further cut into 0.070 × 0.070 inch square bars, for testing transverse rupture strength. Other portions of the billet are used for indentation hardness tests and for other product characterizations. The transverse rupture strength as measured by breaking the 0.070 × 0.070 inch test bars on a nine-sixteenths inch span is about 211,000 psi. The hardness of the billet is 93.0 on the Rockwell A scale.

The square center piece is finished as a cutting tip to 1/2 × 1/2 × 3/16 inch, and the corners are finished with a one thirty-second inch radius, a style known in the industry as SNG-432.

The tip is used to turn a cylinder of Class 30 grey cast iron at a speed of 1,250 surface feet per minute, a depth of 0.050 inch and a feed of 0.005 inch per revolution. After ten minutes the wear land on the flank of the cutting edge is only 0.006 inch deep, which is only half the flank wear measured on a commercial titanium carbide based cutting tip after 10 minutes turning under the same condiitons. When used to mill 4,340 steel having a Brinnell hardness number of 340 at 1,000 surface feet per minute, a width of cut of 2 inches, a depth of 0.050 inch and a feed of 0.0057 inch per revoultion, for a single tooth 6 inches diameter milling head, two corners of the insert run an average distance of 24 inches before failing by chipping. Two corners of a commercial titanium carbide based cutting tip tested under the same condition give an average cutting distance of only 16 inches before failing due to chipping. Thus the composition of the invention shows a considerable improvement over conventional titanium carbide based compositions, both with respect to wear and chip resistance in machining operations on two important classes of metal.

EXAMPLE 2

The procedure of Example 1 is repeated, except that the proportions of the components are changed to give a powder containing 86 volume percent of titanium carbide and 14 volume percent of nickel.

A dense body made by hot pressing this powder as described in Example 1 is found to have a transverse bend strength 207,000 psi and a Rockwell A hardness of 92.2 Examination of an electron micrograph at a magnification of 20,000X on a sample etched as in Example 1 shows a homogeneous composition having an average grain size of about 0.8 microns and a nickel-rich binder phase uniformly distributed at the grain boundaries and having a thickness of 0.1 to 0.5 microns. The esnsity is 98.5 percent of the theoretical density.

An SNG-432 cutting tip made from the hot pressed body is found to yield excellent results in the semi-finishing turning of Class 30 gray cast iron and in the finish milling of Class 30 gray cast iron.

EXAMPLE 3

The procedure of Example 1 is used, changing the proportions of the components to give a powder containing 97 volume percent of titanium carbide and 3 volume percent of nickel. The powder is hot pressed as described in Example 1, modifying the conditions as follows. The sample in the mold is pressed at 500 psi, before being introduced into the hot zone of the vacuum hot press at 1,200°C. It is brought to 1,475°C. maintaining the pressure on the sample at 500 psi during the heat-up period of about 3 mintes. After holding at 1,475°C. for 5 minutes to ensure uniform heating of the sample, the pressure is increased from 500 psi to 4,000 psi and this pressure and temperature of 1,475°C. are maintained for a further 6 minutes. The pressure is then released and the mold and contents are immediately moved out of the furnace into a cool zone and cooled to dull red heat in about five minutes.

The resulting dense body is found to have a transverse rupture strength of 155,000 psi and a Rockwell A hardness of 93.5. Electron micrograph examination of a sample etched as in Example 1 shows a homogeneous composition having an average grain size of about 3 microns and a nickel-rich binder phase uniformly distributed at the grain boundaries and having an average thickness of 0.02 to 0.2 microns. The density is 97 percent of the theoretical density.

A seal vane in a centrifugal pump for pickling acid in a steel plant is made from the above composition, and after being in service for 6 months, inspection of the part shows very little wear or corrosive attack and the part is returned to service.

UTILITY

The pressed products show excellent performance as cutting tools and have advantages over conventional TiC-based tools in certain applications such as turning cast iron and milling alloy steel. The products can also be used as wear parts and refractory and corrosion resistant parts in high temperature equipment.

I claim:

1. A method for making a homogeneous composition consisting of 80 to 97 percent by volume of titanium carbide and 3 to 20 percent by volume of nickel and having (a) an average grain size smaller than 10 microns, (b) a nickel-rich binder phase uniformly distributed at the grain boundaries, substantially all of said binder phase having a thickness of less than 0.5 micron, and (c) a density in excess of 95 percent of the theoretical density, comprising the steps of:
   I. intimately milling together a mixture of fine grain titanium carbide and nickel powder in a hydrocarbon oil, separating, drying and screening the powder in a non-oxidizing atmosphere,
   II. charging in a non-oxidizing atmosphere the titanium carbide-nickel powder to a mold provided with close-fitting pistons and in either sequence (a) applying to the powder by means of said pistons a pressure of 0–500 psi, and (b) introducing the mold into a vacuum furnace preheated to a temperature in the range of from 1,000°C. to 1,475°C.;
   III. heating said mixture under vacuum to a selected temperature in the range of from 1,350°C. to 1,475°C. in a period of time ranging from about 2 minutes to 20 minutes while maintaining a pressure on said mixture of from 0–500 psi;
   IV. maintaining the final temperature and pressure of Step II for a period of time ranging from zero minutes to 5 minutes;
   V. maintaining the temperature of Step IV and applying to said mixture a pressure of from 500 psi to 4000 psi for a period of time ranging from 2 minutes to 6 minutes; and
   VI. thereafter immediately releasing the pressure on the piston, removing the mold from the furnace and rapidly cooling the resulting titanium carbide-nickel composition.

2. The process of claim 1 wherein Step III the selected final temperature is about 1,400°C., the time is about 4 minutes, and the pressure on the sample is between 100 and 200 psi.

3. The process of claim 1 wherein the pressure on the sample in Step V is about 4,000 psi.

4. A method for making a homogeneous composition consisting of 80 to 97 percent by volume of titanium carbide and 3 to 20 percent by volume of nickel and having (a) an average grain size smaller than 10 microns, (b) a nickel-rich binder phase uniformly distributed at the grain boundaries, substantially all of said binder phase having a thickness of less than 0.5 micron, and (c) a density in excess of 95 percent of the theoretical density, comprising the steps of:

I. intimately milling together a mixture of fine titanium carbide and nickel powder in a hydrocarbon oil, separating, drying and screening the powder in a non-oxidizing atmosphere;

II. charging in a non-oxidizing atmosphere the titanium carbide-nickel powder to a mold provided with close-fitting pistons and in either sequence (a) applying to the powder by means of said piston a pressure of 100 to 200 psi, and (b) introducing the mold into a vacuum furnace preheated to a temperature in the range of from 1,000° to 1,475°C.;

III. heating said mixture under vacuum to about 1,400°C. in 2 to 20 minutes while maintaining a pressure on said mixture of from 100 to 200 psi;

IV. maintaining the temperature and pressure of Step III for about 2 minutes;

V. maintaining a temperature of Step IV and applying a pressure on said mixture of about 4,000 psi for about 4 minutes; and VI. immediately releasing the pressure on the pistons, removing the mold from the furnace and cooling the resulting titanium carbide-nickel composition to dull red heat in about 5 minutes.

* * * * *